United States Patent Office 3,452,862
Patented July 1, 1969

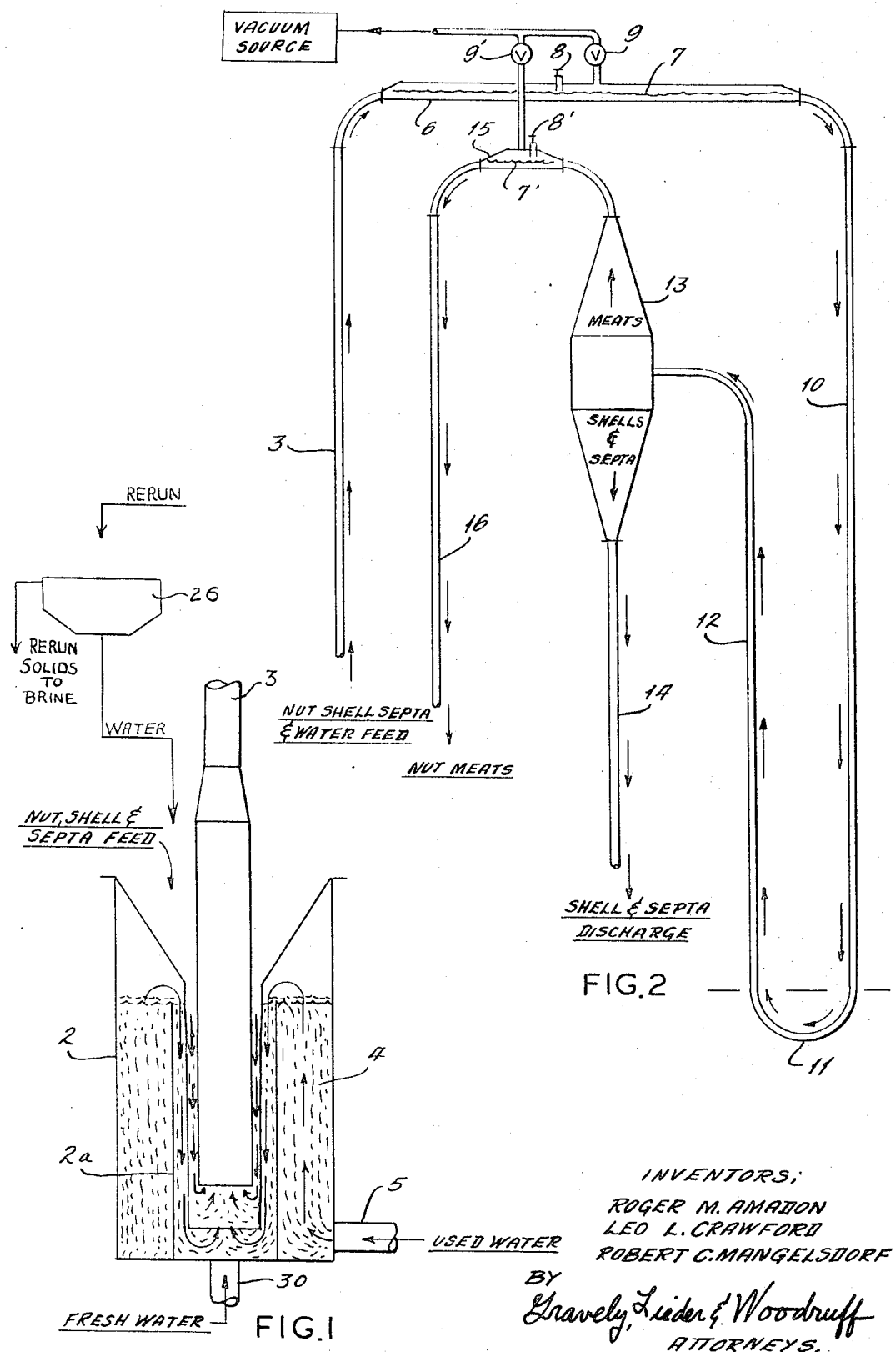

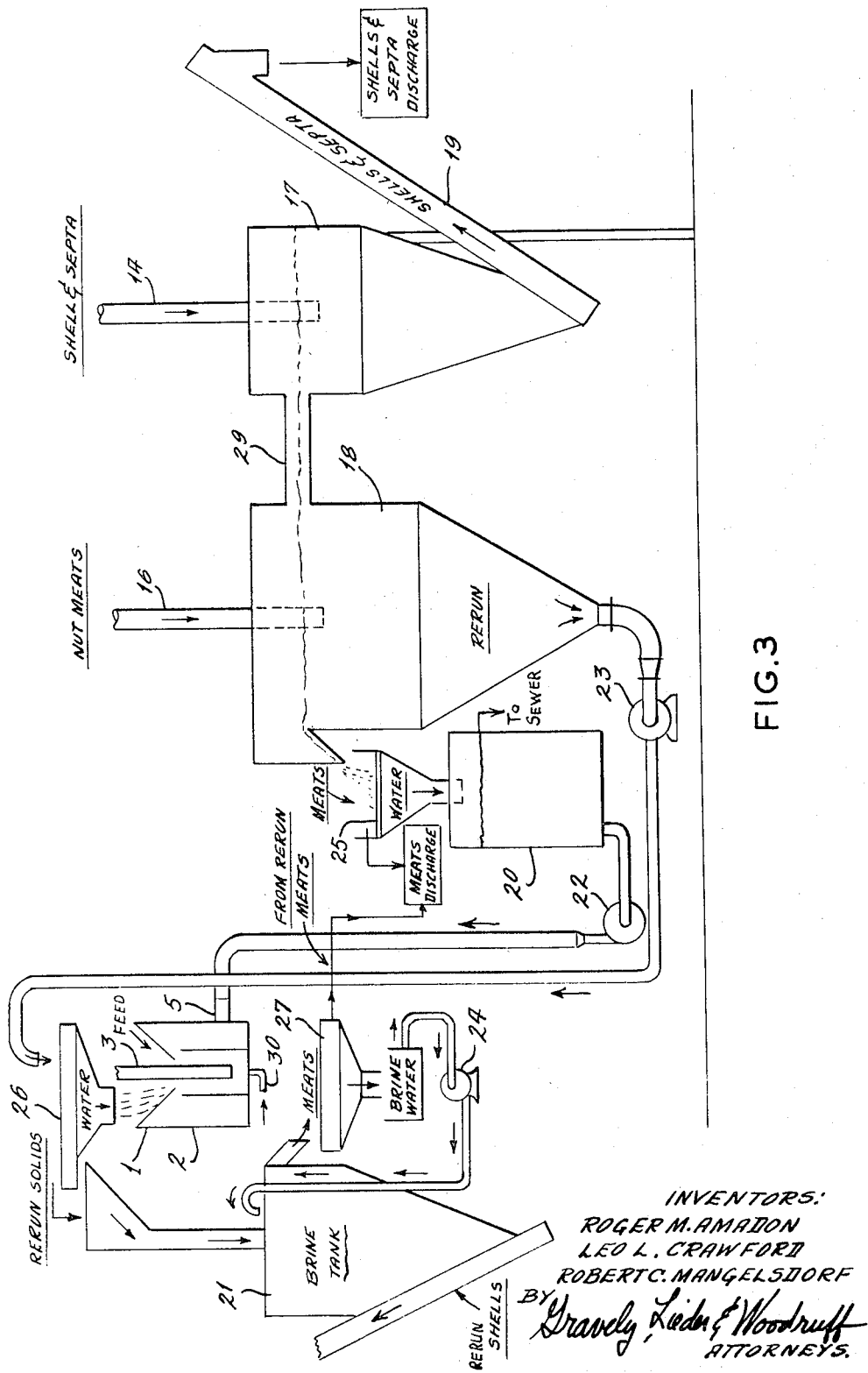

3,452,862
SEPARATION OF PECAN MEATS AND SHELLS
Roger M. Amadon, Greenville, Ill., Leo L. Crawford, Andalusia, Ala., and Robert C. Mangelsdorf, Greenville, Ill., assignors to Pet Incorporated, St. Louis, Mo., a corporation of Delaware
Filed Feb. 23, 1967, Ser. No. 617,913
Int. Cl. B03b *11/00;* B03d *1/04*
U.S. Cl. 209—2
17 Claims

ABSTRACT OF THE DISCLOSURE

A continuous process and apparatus for separating nut meats from shells and septa in which the feed is wetted and conditioned under 26" vacuum and exposed to positive pressure before being separated in a separator tank under 20" vacuum. The separated meats are again conditioned under 26" vacuum and deposited in a float tank where clean meats are separated and about 10% rerun is treated in a brine tank for another separation. The process effects complete separation of septa.

This invention relates to a hydraulic system for separating the various size pieces of nut meats from shells after the shells are blow by fans in the cracking and shelling process.

At present there are several methods being used for separating nut meats from shells, such as:

(1) A batch type operation in which the material is fed into a conditioning tank and subjected to vacuum for a given period of time. The vacuum is broken by filling the tank with water. After the water is drained, the material is dumped manually into a tank containing brine where separation occurs at atmosphereic pressure. The brine strength necessary for good separation varies with each size of nut and a good separation depends wholly upon the operator controlling the strength of brine. Too strong a solution causes shells to rise with the meats and too weak a solution causes meats to sink with the shell.

(2) A continuous operation whereby the material is fed into a separating chamber through a vacuum seal rotary valve. The separating chamber is under 20" vacuum and maintains a water level in which the temperature of the water is 100° F. As the meats rise to the surface of the water, they are carried to one end of the chamber by flowing water caused by a series of spray nozzles where they are discharged through another rotary valve. The shells that sink are moved to the opposite end of the chamber by a screw conveyor where they too are discharged through a rotary valve. The 100° F. water is an ideal condition for bacteria growth and the mechanical separator lends itself to maintenance problems. In particular, the wearing of the vacuum seals on the rotary valves is a problem, due possibly to the abrasivve action of the shells. Maintaining the necessary vacuum for separation is essential and wearing of these seals causes loss in vacuum which would result in poor separation.

(3) A continuous operation whereby the material is fed into the flow of water where it is subjected to a vacuum and discharged into a separating tank where separation takes place at atmospheric pressure. The meats are carried off by the overflowing water which is then recirculated. The material that sinks, which contains some meats, is discharged by screw conveyor into another tank where the water temperature is 90–100° F. and a second separation occurs. The material floating off the surface of the water is caught in a basket to be dumped manually into the first separating tank when full, which is very inefficient. The shells that sink are discharged by a second screw conveyor.

The principal object of the present invention is to separate the various size pieces of nut meats from shells in a continuous operation by separating under vacuum in a non-mechanical separator using the flow of water to carry the material through the system and discharging the desired meats at one location and undesired shells at another.

Another object is to separate the nut meats from the shells using city water, thus eliminating the use of brine as the main separating media.

Still another object is to separate the nut meats from the shells at ambient temperatures and have a complete change of water every twenty minutes as a deterent against bacteria growth.

A further object is to separate the nut meats from the shells in a completely automatic system having separate cycles for filling the system; for automatic operation; for manual operation, if desired; and an inplace cleaning and sanitizing cycle.

These and other objects and advantages will become apparent hereinafter.

Although this application is based on the separation of pecan meats and shells, it may be used for separating other types of nuts or fruits and vegetables.

Summary of the invention

The present invention uses the principle of a hydraulic siphon whereby material consisting of pecan meats and shells is introduced into a feed section of the system and water carries the material through the system. The meats and shells are first exposed to a 26" vacuum for 7.5 seconds, and then to atmospheric pressure to drive water into the shells and septa. (Septa are the partitions between the two segments of nut meats.) The nut meats and shells are then exposed to a 20" vacuum in a separating chamber where they separate. The meats rise and are taken away at one location. The shells and septa sink and are discharged at a separate location.

Description of the drawings

FIG. 1 is an enlarged schematic view of the feed mechanism;

FIG. 2 is a schematic arrangement of the conditioning and separating portion of the process;

FIG. 3 is a schematic arrangement of the overall process with the portion shown in FIG. 2 removed.

The four figures must be viewed together, particularly FIGS. 2 and 3. FIG. 3 represents a schematic layout of the entire process except for the vacuum treatment step which is shown in FIG. 2. The pipes 16 and 14 shown broken in FIG. 3 connect to the pipes 16 and 14 of FIG. 2. FIG. 1 is an enlarged view of the feed system and the pipe 3 of FIG. 2 connects to the broken pipe 3 of FIG. 1 to complete the system.

Detailed description

Figure 4:
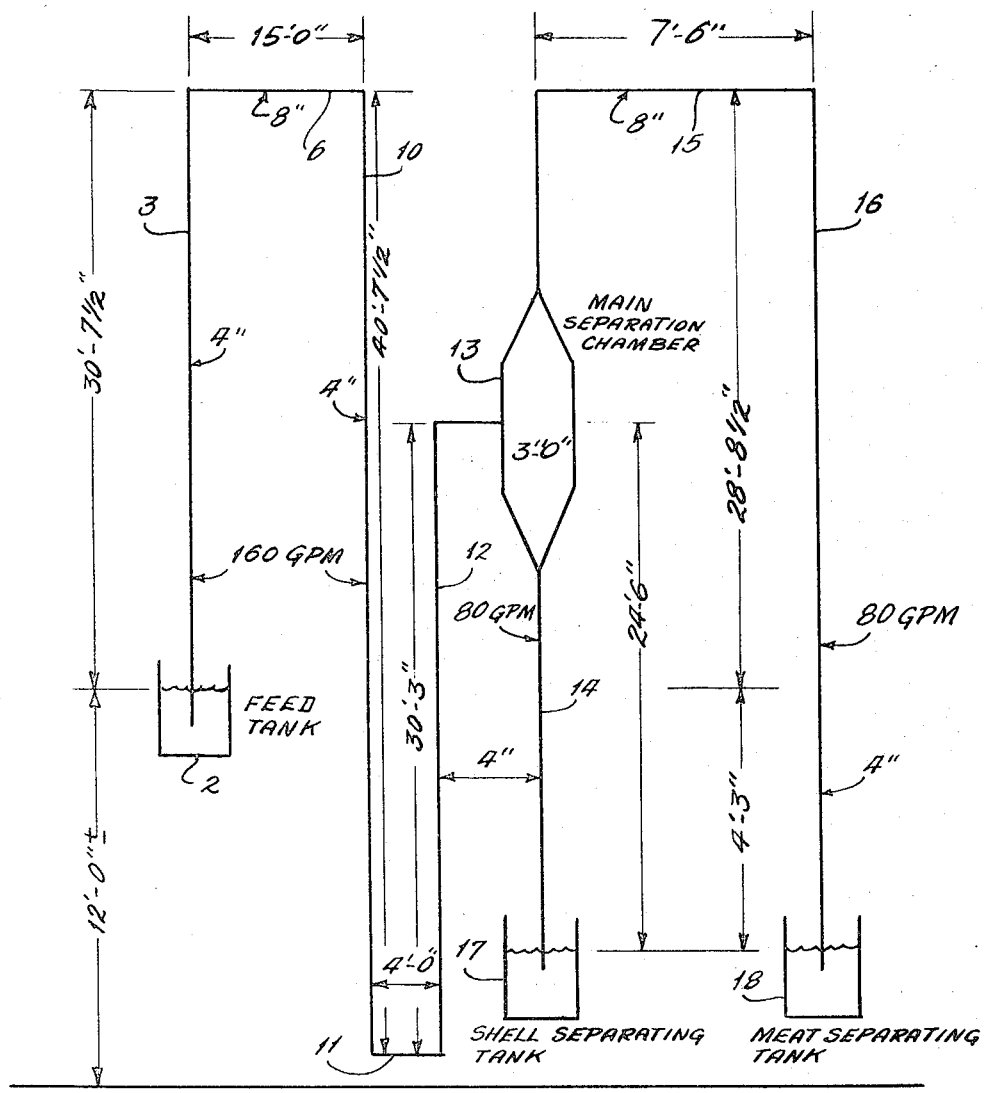
FIG. 4 is a schematic layout of the piping system showing preferred heights and pipe sizes.

Referring to FIG. 1, the feed material (nut meats and shells together) is introduced into the conical section 1 of the feed tank 2 by an external conveying system (not shown). The feed material falls by gravity around the feed pipe 3 and is drawn downward into the tank 2 by the overflowing water 4 that is being pumped into the feed tank through a conduit 5 from the overflow tank 20 of FIG. 3. Water from the vibrating screen 26 which separates the rerun solids from rerun water also enters the conical section 1 of the feed tank 2. The water overflows an internal wall or baffle 2a and carries the feed into the feed pipe 3. (The flow is indicated by the arrows in FIG. 1.) Fresh water enters the system through the conduit 30 which makes a complete fresh water change every 20 minutes. Referring to FIG. 2, the feed material moves up the feed pipe 3 and in so doing is gradually subjected to decreasing pressure until it reaches the conditioning chamber 6 at which time it is subjected 26″ vacuum to remove air from the shells. The water level (indicated by the numeral 7) in the conditioning chamber 6 is controlled by a standard probe level control 8. When the water level control is satisfied, a solenoid valve 9 closes, isolating the source of vacuum from the chamber 6. As the water level drops, the solenoid valve 9 opens drawing air from the chamber 6 raising the water level back to the desired level.

The feed material proceeds through the conditioning chamber 6 and down a pipe 10 where the pressure is gradually increasing because of the increasing static head until at the loop 11 there is positive pressure to drive water into the shell and septa. The material is carried up the pipe 12 and enters the separator 13 where there is a 20″ vacuum. While in the separator 13 the shells and septa sink and the meats rise because the density of the water therein is between that of the meats and that of the shells and septa.

The pressure in the loop 10-11-12 is about 14.0 to 15.5 p.s.i.a.

The shells are discharged down a pipe 14 into the shell tank 17 (FIG. 3). The rising meats enter a second vacuum chamber 15 and are conditioned a second time under 26″ vacuum for the benefit of any shells that might have risen. The water level in the chamber 15 (indicated by the numeral 7′) is controlled by a probe level control 8′, which controls the operation of a solenoid valve 9′ in the same manner as in the conditioning chamber 6. The nut meats are carried down a pipe 16 into the meat tank 18 (FIG. 3).

Referring to FIG. 3, the shells sink in the shell tank 17 and are removed by a screw conveyor 19. The water from the shell tank 17 overflows into the meat tank 18 through a trough 29.

The meats entering the meat tank 18 float to the surface and overflow out of the meat tank 18 onto a vibrating screen 25 to be removed. The overflowing water spills into an overflow tank 20 where it is pumped by a pump 22 through a conduit 5 back to the feed tank 2 to be recirculated. As mentioned before, the rerun which is the pithy meats and unremoved shells which sink in the meat tank 18 are pumped by a pump 23 onto a vibrating screen 26 and discharged into a brine tank 21. The water from the rerun is funneled back to the conical section 1 of the feed tank 2.

Excess water from the overflow tank 20 is discharged to the sewer through a conduit 20a. The removal of water from the tank 20 and addition of fresh water through the conduit 30 are timed so that a complete change of water in the system is effected every 20 minutes.

The rerun which constitutes approxiamtely 10% of the total material run through the system is separated with brine. The meats float on the surface and are discharged onto a vibrating screen 27 to be reclaimed. The brine water is recirculated with pump 24 back to the brine tank 21. The shells sink and are discharged through a screw conveyor 28.

EXAMPLE I

A 50 lb. sample of material blown out by fans from $+^{28}\!/_{64}$ segment of shells and meats is fed by a Syntron vibrator at a rate of 2400 lbs./hr. to the feed section 2 of the system. The feed material is subjected to the conditions as previously described in the flow diagram, that is, a 7.5 second exposure to 26″ vacuum, then to atmospheric pressure, and separated under 20″ vacuum in the separator. The meats, shells, and rerun are collected on separate screens as they are discharged from the system. The rerun is then placed in a tank containing a 40% brine solution for separation. The results of the separation are as follows:

(A) Separation of meats and shells from main separating chamber:
  Percent shell in meats _____ 0.30
  Percent meats in shell _____ 0.0
There was 9.05% rerun to be separated with brine.
(B) Combining the shells from the main separator with shells from the brine separator:
  Percent meat in shell _____ 0.024
Combining the meats from the main separator with meats from the brine separation:
  Percent shells in meats _____ 0.41

EXAMPLE II

A 50 lb. sample of material blown out by fans from $-^{28}\!/_{64} +^{19}\!/_{64}$ segment of pecan shells and meats is fed by a Syntron vibrator at a rate of 2400 lbs./hr. to the feed section of the system. The material is subjected to the condtions as previously described in the flow diagram, that is, a 7.5 second exposure to 26″ vacuum, then to atmospheric pressure, and separated under 20″ vacuum in the separator. The meats, shells and rerun are collected on separate screens as they are discharged from the system. The rerun is then placed in a tank containing a 40% brine solution for separation. The results of the separation are as follows:

(A) Separation of meats and shells from main separating chamber:
  Percent shell in meat _____ 0.21
  Percent meats in shell _____ 0.00
There was 7.6% rerun to be separated with brine.
(B) Combining the shells from the main separator with the shells from the brine separator:
  Percent meats in shells _____ 0.048
Combining the meats from the main separator with meats from the brine separator:
  Percent shells in meats _____ 0.054

EXAMPLE III

A 50 lb. sample of material from a $-^{19}\!/_{64} +\frac{1}{2} \times \frac{1}{12}$ slotted screen segment of shells and meats is fed by a Syntron vibrator at a rate of 2400 lbs./hr. to the feed section of the system. The material is subjected to the conditions as previously described in the flow diagram, that is, a 7.5 second exposure to 26″ vacuum, then to atmospheric pressure, and separated under 20″ vacuum in the separator. The meat, shells, and rerun are collected on separate screens as they are discharged from the system. The rerun is then placed in a tank containing 40% brine solution for separation. The results of the separation are as follows:

(A) Separation of meats and shells from main separating chamber:
  Percent shell in meats _____ 0.01
  Percent meats in shell _____ 0.00
There was 11.9% rerun to be separated with brine.
(B) Combining the shells from the main separator with shells from the brine separation:
  Percent shells in meats _____ 0.08

The following table collects the foregoing data in tabulated form:

The temperature of the water has no appreciable effect on the separation.

TABLE

| Size material | Test No. | Separation of pecan meat and shell from main separating system (percent) | | Combining separation of shell and meats of main system with shells and meats of brine operation (percent) | | Percent rerun collected |
|---|---|---|---|---|---|---|
| | | Meats in shells | Shells in meats | Meats in shells | Shells in meats | |
| Material blown by fans from +28/64 segment of pecan meats and shells. | 1 | 0.0 | 0.3 | 0.024 | 0.414 | 9.05 |
| | 2 | 0.0 | 0.0 | 0.47 | 0.206 | 9.58 |
| Material blown by fans from −28/64 +19/64 segment of pecan meats and shells. | 1 | 0.0 | 0.21 | 0.048 | 0.54 | 7.6 |
| | 2 | 0.0 | 0.38 | 0.087 | 0.78 | 8.46 |
| Materials which passes through a 19/64 round opening screen and is retained on a ½ x 1/12 slotted screen. | 1 | 0.0 | 0.01 | 0.111 | 0.08 | 11.5 |
| | 2 | 0.0 | 0.02 | 0.0038 | 0.114 | 9.9 |

The present piping arrangement is designed to operate so as to satisfy Bernouilli's theorem. This theorem states that in steady flow the total head (pressure head plus potential head plus velocity head) at any section is equal to the total head at any further section in the direction of flow, plus the lost head due to friction between these two sections, or $$\frac{P_1}{W}+Z_1+\frac{V_1^2}{2G}=\frac{P_2}{W}+Z_2+\frac{V_2^2}{2G}+\text{Lost Head}$$

The friction head or lost head is dependent upon the length of pipe, internal diameter of the pipe, average velocity of the pipe, acceleration due to gravity and a friction factor according to the equation:

$$H=F\frac{L}{D}\frac{V^2}{2G}$$

The potential head is the height over or under a reference level. These formulae are well-known to those in the art and FIG. 4 shows a piping diagram with lengths of pipe and height above a reference level useful when the vertical runs are of 4-inch pipe which are sufficient for a product feed rate of 1800–3600 pounds per hour. While the size of nut meats being processed has some effect, for best operation to prevent jams, a velocity of 4 ft. per second or greater should be maintained in the system. Accordingly, the preferred flow rate in the system is 160 gallons per minute.

The conditioning chamber 6 is an 8-inch pipe and the depth of water varies approximately from 2 to 5 inches above the bottom of the pipe. The vacuum in the chamber 6 is greater than about 26 inches of mercury and preferably is 26–27 inches of mercury. Unless the septa is conditioned at at least 26-inch vacuum and then subjected to atmospheric or greater pressure, it does not completely separate with the shells from the nut meats in the separating chamber 12. The nut meats stay in the conditioning chamber 6 for about 6 to about 9 seconds and preferably about 7.5 seconds.

The nut meats and shells stay in the loop 10–11–12 about 18.5 seconds, but this time is not critical as long as the mixture is subjected to atmospheric or greater pressure.

The vacuum in the main separating chamber 13 must be about 20–20.5 inches of mercury at the inlet. Separation at other vacuum levels does not give a satisfactory result.

The second conditioning chamber 15 is maintained at a vacuum of about 26 to about 27 inches of mercury and is an 8-inch pipe with the depth of water being about 2 to 5 inches above the bottom of the pipe. The meats stay in the second conditioning chamber 15 from about 0.5 to 1.5 seconds, and preferably about 1 second.

The size of the feed can vary from pecan nut halves to a small meal size mixture.

The feed stays in the separator 13 about 50 to 120 seconds and preferably about 75 seconds.

The concentration in the brine tank 21 is about 26 to about 40 percent salt and preferably about 32–34 percent salt. The overrun stays in the brine tank about one to about three seconds, preferably about two seconds.

The system is so designed to handle 2400 lbs./hr. with an initial flow rate of 160 g.p.m. in the feed pipe. The flow in each of the shell pipe and meat pipe is 80 g.p.m. These rates can be varied for any desired size plant.

Advantages of this invention over presently known methods include the following:

(1) The system is continuous and completely automatic.
(2) There is easy maintenance because of no mechanical seals, drives, etc.
(3) The system eliminates the use of brine in 90% of the operation.
(4) The system eliminates the human element in making separation.
(5) There is no mechanical apparatus in contact with product during transport through the separating system under vacuum, thereby eliminating any chance of damage to the nut meats.
(6) The system completely removes the septa which is not attained in other methods.
(7) The material is fed into the flow of the water which acts as a carrier for the material through the system giving a wetting effect during the complete cycle.
(8) The reliability of the separation is always good due to the non-mechanical separator.
(9) All types and sizes of nut means and shells can be run through the system.

This invention is intended to cover all changes and modifications of the example of the invention herein chosen for purposes of the disclosure, which do not constitute departure from the spirit and scope of the invention.

What is claimed is:

1. A process of separating nut meats from shells and septa comprising the steps of wetting a feed mixture of shells, septa and meats to be separated with water to form an aqueous slurry; moving the slurry to a conditioning tank; conditioning the slurry under a vacuum of about 26 to about 27 inches of mercury; thereafter exposing the slurry to substantially atmospheric or greater pressure, and separating a slurry of meats from the septa and shells under a vacuum of about 20 to about 20.5 inches of mercury.

2. The process of claim 1 wherein the slurry is exposed to the conditioning vacuum for about 6 to about 9 seconds and to the separating vacuum for about 50–120 seconds.

3. The process of claim 1 wherein the separated meats slurry is conditioned under a vacuum of about 26 to about 27 inches of mercury.

4. The process of claim 3 wherein the separated meats slurry is exposed to the vacuum for about 0.5 to about 1.5 seconds.

5. The process of claim 3 wherein the conditioned meats slurry is exposed to atmospheric pressure and deposited into a nutmeat receptacle, including the steps of collecting the meats in the overflow from the top of the nutmeat receptacle, collecting a rerun from the bottom of the nutmeat receptacle, and separating the collected meats from overflow water.

6. The process of claim 5 wherein the overflow water is returned to wet the initial feed mixture in a continuous process.

7. The process of claim 5 wherein the shells and septa slurry are deposited in a receptacle and the overflow and floating particles are deposited into the nutmeat receptacle, and the shells and septa removed from the bottom.

8. The process of claim 7 wherein overflow water from the nutmeat receptacle is returned to wet the initial feed mixture and the solids in the rerun are separated from the water, including the steps of depositing the rerun water into the initial feed, depositing the rerun solids in a brine tank, collecting rerun shells and septa from the bottom of the brine tank, collecting rerun meats from the overflow of the brine tank, separating said meats from overflow brine, and returning the overflow brine to the brine tank in a continuous process.

9. The process of claim 1 including the steps of depositing the separated meats slurry in a receptacle, collecting clean meats in the overflow from the top of the receptacle, removing a rerun slurry from the bottom of the receptacle, separating the solids in the rerun, depositing the said solids in a brine tank and collecting the meats in the rerun from the brine tank overflow.

10. The process of claim 9 wherein the brine in the tank has a concentration of 26 to 40% salt.

11. The process of claim 9 wherein the shells and septa in the rerun are removed from the bottom of the brine tank and the overflow brine is separated from the meats and returned to the brine tank in a continuous operation.

12. The process of claim 1 including the steps of conditioning the separated meats slurry under a vacuum of about 26 to about 27 inches of mercury, exposing the meats slurry to atmospheric pressure, depositing the slurry in a tank, separating the meats from water, depositing a rerun from the bottom of the tank into a brine of 32–34% salt concentration, and separating shells and septa from meats in the brine.

13. An apparatus for continuously separating nutmeats from shells and septa comprising means for wetting a feed mixture of nutmeats, shells and septa with water, conduit means for conditioning the feed positioned at a higher level than the feed wetting means, means for establishing a vacuum in the conditioning conduit to remove air from the septa and shells, said conditioning conduit means including means for exposing the feed to substantial atmospheric pressure, a separator chamber, means connecting the conditioning conduit to the separating chamber, means for establishing a vacuum in the separator chamber to make this density of the water therein between that of the nutmeats and that of the septa and shells, means for removing a nutmeats slurry from the top portion of the separator chamber, means for removing shells and septa slurry from the bottom portion of the separator chamber.

14. The apparatus of claim 13 including a tank into which the nutmeats slurry is positioned, means for removing the nutmeats from the top of the tank, and means for collecting a rerun from the bottom of the tank, a brine tank, means for depositing the rerun in the brine tank, and means for recovering the nutmeats from the top of the brine tank and the shells from the bottom thereof.

15. The apparatus of claim 14 including a second conditioning chamber for the separated nutmeats from the separator chamber prior to entering the nutmeats tank, and means for establishing a vacuum of about 26 to 27 inches of mercury in the second conditioning chamber.

16. The apparatus of claim 14 including a shells and septa tank, means for depositing the shells and septa slurry from the separator chamber into the shells and septa tank, means for removing the top portion of the contents of the shells and septa tank and depositing same into the nutmeats tank, and means for removing shells and septa from the bottom of the shells and septa tank.

17. The apparatus of claim 13 wherein the means for wetting the feed mixture comprises a mixing vessel, conduit means terminating near the bottom of the mixing vessel communicating with the conditioning conduit, an internal baffle spaced from and surrounding the conduit means, said baffle extending upwardly from the bottom of the mixing vessel, means for admitting recirculated water from the nutmeats slurry separation to the vessel between the vessel wall and the baffle, and means for admitting fresh water to the vessel.

References Cited

UNITED STATES PATENTS 2,241,737    5/1941    Romberg _____ 209—3

FRANK W. LUTTER, *Primary Examiner.*

U.S. Cl. X.R.

209—3, 173